US008411672B2

(12) United States Patent
Baum et al.

(10) Patent No.: US 8,411,672 B2
(45) Date of Patent: *Apr. 2, 2013

(54) METHODS AND APPARATUS FOR PROVIDING EMERGENCY TELEPHONE SERVICE TO IP-BASED TELEPHONE USERS

(75) Inventors: Robert T. Baum, Gaithersburg, MD (US); Jim Curry, Herndon, VA (US)

(73) Assignee: Verizon Services Corp., Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/829,170

(22) Filed: Jul. 1, 2010

(65) Prior Publication Data

US 2010/0271982 A1  Oct. 28, 2010

Related U.S. Application Data

(63) Continuation of application No. 10/457,111, filed on Jun. 9, 2003, and a continuation-in-part of application No. 10/337,106, filed on Jan. 6, 2003.

(60) Provisional application No. 60/455,353, filed on Mar. 17, 2003, provisional application No. 60/346,596, filed on Jan. 8, 2002.

(51) Int. Cl.
*H04L 12/66* (2006.01)

(52) U.S. Cl. ............... 370/352; 370/395.2; 370/401; 379/37; 379/45

(58) Field of Classification Search .......... None
See application file for complete search history.

(56) References Cited

U.S. PATENT DOCUMENTS

| 5,109,406 | A | 4/1992 | Mano et al. |
| 6,012,088 | A | 1/2000 | Li et al. |
| 6,069,890 | A | 5/2000 | White et al. |
| 6,134,315 | A | 10/2000 | Galvin |
| 6,298,130 | B1 | 10/2001 | Galvin |
| 6,307,920 | B1* | 10/2001 | Thomson et al. ............ 379/45 |
| 6,335,927 | B1 | 1/2002 | Elliott et al. |
| 6,345,095 | B1 | 2/2002 | Yamartino |
| 6,363,065 | B1 | 3/2002 | Thornton et al. |
| 6,393,484 | B1 | 5/2002 | Massarani |
| 6,636,983 | B1 | 10/2003 | Levi |

(Continued)

OTHER PUBLICATIONS

Schulzrinne, H.; Arabshian, K.;"Providing emergency services in Internet telephony";May/Jun. 2002; IEEE Internet Computing; vol. 6 Issue:3 pp. 39-47.*

*Primary Examiner* — Andrew Chriss
*Assistant Examiner* — Salvador E Rivas

(57) ABSTRACT

For purposes of servicing emergency calls, such as 911 calls, a telephone number is associated with each edge router port used to provide IP service to a customer premise location. A telephone number is associated with the edge router port and the corresponding customer location. The telephone number and location information are stored in a database used for providing emergency calling party location information. When a switch used for routing IP calls detects a telephone call to an emergency call center it determines the edge router port from which the call was placed and the telephone number associated with the port for emergency call purposes. The call is then forwarded to the emergency call service center with the determined telephone number being supplied as the calling party number. Performing a lookup operation using the supplied telephone number the emergency service operator determines the location from which the call was placed.

13 Claims, 13 Drawing Sheets

U.S. PATENT DOCUMENTS

| | | | |
|---|---|---|---|
| 6,678,265 B1 * | 1/2004 | Kung et al. | 370/352 |
| 6,680,998 B1 | 1/2004 | Bell et al. | |
| 6,684,250 B2 | 1/2004 | Anderson et al. | |
| 6,738,808 B1 * | 5/2004 | Zellner et al. | 709/223 |
| 6,795,444 B1 * | 9/2004 | Vo et al. | 370/401 |
| 6,839,323 B1 | 1/2005 | Foti | |
| 6,845,388 B1 * | 1/2005 | Philyaw | 709/204 |
| 6,856,676 B1 * | 2/2005 | Pirot et al. | 379/201.01 |
| 6,925,076 B1 | 8/2005 | Dalgic et al. | |
| 6,940,866 B1 | 9/2005 | Miller et al. | |
| 6,975,587 B1 | 12/2005 | Adamski et al. | |
| 7,007,080 B2 | 2/2006 | Wilson | |
| 7,039,721 B1 | 5/2006 | Wu et al. | |
| 7,072,346 B2 | 7/2006 | Hama | |
| 7,184,418 B1 | 2/2007 | Baba et al. | |
| 7,197,549 B1 | 3/2007 | Salama et al. | |
| 7,203,187 B1 | 4/2007 | Richardson et al. | |
| 7,320,070 B2 | 1/2008 | Baum | |
| 7,359,368 B1 | 4/2008 | Pearce | |
| 2001/0040885 A1 | 11/2001 | Jonas et al. | |
| 2002/0021675 A1 | 2/2002 | Feldmann | |
| 2002/0054667 A1 * | 5/2002 | Martinez | 379/45 |
| 2002/0057764 A1 | 5/2002 | Salvucci et al. | |
| 2002/0101860 A1 | 8/2002 | Thornton et al. | |
| 2002/0136199 A1 * | 9/2002 | Hartmaier | 370/352 |
| 2002/0136361 A1 | 9/2002 | Stumer et al. | |
| 2002/0165835 A1 | 11/2002 | Igval | |
| 2003/0063714 A1 * | 4/2003 | Stumer et al. | 379/37 |
| 2003/0147518 A1 | 8/2003 | Albal et al. | |
| 2003/0161335 A1 | 8/2003 | Fransdonk | |
| 2003/0185361 A1 | 10/2003 | Edwards | |
| 2003/0187986 A1 | 10/2003 | Sundqvist et al. | |
| 2004/0190497 A1 | 9/2004 | Knox | |
| 2004/0202171 A1 | 10/2004 | Hama | |
| 2004/0249975 A1 | 12/2004 | Tuck et al. | |

* cited by examiner

METHODS AND APPARATUS FOR PROVIDING EMERGENCY TELEPHONE SERVICE TO IP-BASED TELEPHONE USERS

RELATED APPLICATIONS

The present invention is a continuation of allowed U.S. patent application Ser. No. 10/457,111 filed Jun. 9, 2003 which claims the benefit of U.S. Provisional Patent Application Ser. No. 60/455,353, filed Mar. 17, 2003 titled "Methods and Apparatus For Supporting IP Telephony" and is a continuation-in-part of U.S. Utility patent application Ser. No. 10/337,106, filed on Jan. 6, 2003 titled "Methods And Apparatus For Determining The Port And/Or Physical Location Of An IP Device And For Using That Information" which claims the benefit of U.S. Provisional Patent Application Ser. No. 60/346,596, filed Jan. 8, 2002 titled "Methods And Apparatus For Determining The Port And/Or Physical Location Of An IP Device And For Using That Information", each of which is hereby expressly incorporated by reference in its entirety.

FIELD OF THE INVENTION

The present invention is directed to communications systems and, more particularly, to methods and apparatus for integrating IP-based telephone users into known emergency telephone services, e.g., 911.

BACKGROUND OF THE INVENTION

Digital communications networks have continued to grow in importance as people have come to rely on the electronic exchange of information to support both business and personal pursuits. E-mail, the electronic transfer of files, and various other services are made possible by the use of digital communications networks.

The type of digital communications network employed often depends on the size of the network to be implemented, as well as the needs and capabilities of the party or parties implementing the network. Hardware cost and network management complexity are often a factor when choosing the type of network to be implemented.

Networks limited to a small geographical region, e.g., home or single office location, are frequently called local area networks ("LANs"). LANs are often privately-owned networks within a single building or small campus. LANS are widely used to connect personal computers and workstations at a single location, e.g., company office or residence, to one another and to shared resources such as printers and/or local centralized file storage.

One popular type of LAN, an IEEE 802.3 standard based LAN is popularly called Ethernet. Ethernet is a bus based broadcast network with decentralized control. When using Ethernet, data, e.g., messages, information and signals are transmitted in Ethernet using frames. Ethernet devices broadcast and receive frames over the shared bus over which the frames are broadcast. The format of an IEEE 802.3 frame 100 is shown in FIG. 1. Each frame 100 starts with a 7 byte preamble 102 containing a preset bit pattern. The preamble 102 is followed by a start of frame byte 104 which includes the bit pattern 10101011 used to denote the start of the frame. Next come two addresses, a destination address 106 and a source address 108. The high-order bit of the destination address is a 0 for ordinary addresses and 1 for group addresses. Group addresses, in contrast to individual device addresses, allow multiple stations, e.g., devices coupled to the Ethernet, to receive frames including a single group address. When a frame is sent to a group address, all the stations in the group receive it. Sending to a group of stations is called a multicast. The address consisting of all 1 bits is reserved for broadcast. A frame containing all is in the destination field, indicating a broadcast, is delivered to all stations on the network.

Six byte global Media Access Control (MAC) Ethernet device addresses are assigned by a central authority to ensure that no two stations on the same Layer 2 network, e.g., Ethernet LAN, have the same global address. Manufacturers of Ethernet devices, e.g., networking boards, request a block of addresses from the central authority to assure that no two Ethernet boards are assigned the same global MAC address. The boards then send and receive frames based on the 48-bit MAC address programmed into the board by the manufacturer. Because source MAC address information is inserted into Ethernet frames by the Ethernet boards, the source address 108 in an Ethernet frame is usually accurate and is difficult to fake.

Since Ethernet MAC address are unique at least on the same Layer 2 network, and potentially globally, any device on a Layer 2 network can address any other device on the network by just using the right 48 bit MAC address assigned to the device being addressed.

MAC addresses are data link layer addresses. The data link layer corresponds to the second layer of the seven layer OSI (Open Systems Interconnection) Reference Model. As a result, Ethernet LANs and other LANS which use data link layer addresses are sometimes called Layer 2 networks.

In addition to the address information 106, 108 the Ethernet frame includes a length of data field 110, data field 112, padding field 114 and a checksum field 116. As will be discussed below, information intended to be transmitted over an IP based network may be included in the data field 112.

While Layer 2 networks are well suited for implementing LANs, e.g., at relatively small sites, it is often desirable to connect devices, e.g., computers located on different LANs. Layer 3 networks, which rely on network protocols, e.g. TCP/IP protocols, are often used for interconnecting Layer 2 networks. Layer 3 packets, e.g., IP packets, are often encapsulated in Layer 2 frames to extend the reach of the Layer 3 network to host devices on the Layer 2 network. This permits Layer 2 signaling and frames to be used for transmissions of data over the Ethernet while preserving Layer 3 addressing information for transmission over the Layer 3 network. The network resulting from interconnecting one or more Layer 2 and Layer 3 networks is often referred to as an internet.

The Internet is a well-known worldwide internet that is used to connect computers and other devices located at universities, governments offices, businesses and individuals together.

FIG. 2 is an extremely simplistic representation of the Internet 200. As illustrated, the Internet 200 includes a plurality, e.g., first and second, Layer 2 networks 201, 203, coupled together by a Layer 3 network 205. While only two Layer 2 networks, e.g., Ethernet LANs, are shown, many thousands of such networks may be part of the Internet. Edge routers, e.g., multi-protocol routers, capable of converting between Layer 2 and Layer 3 formats and addressing schemes, are often used to connect Layer 2 networks to Layer 3 networks. In FIG. 2, first edge router 216, connects the first Layer 2 network 201 to the Layer 3 network 205. Similarly the second edge router 218 connects the second Layer 2 network 203 to the Layer 3 network 205.

In the FIG. 2 example, two host devices 208, 210 are shown coupled to the first Ethernet bus 204, used to implement the Ethernet LAN 201, while third and fourth host devices 212, 214 are shown coupled to the second Ethernet bus 206 used to implement Ethernet LAN 203. While only two hosts are shown on each Ethernet LAN it is to be understood that a large number of hosts may be coupled to any one of the Layer 2 networks, corresponding to Ethernet busses 204, 206, at any given time.

Routers, serve as forwarding devices and, optionally, protocol conversion devices. In the FIG. 2 diagram, edge routers 216 and 218 have the capability of converting between Ethernet frames and IP packets, and vice versa, using one or more tables relating IP addresses to MAC addresses.

Routers 222, 224, 226 and 228 internal to the Layer 3 network form part of what is sometimes called the Internet backbone. Since these routers do not need to handle Ethernet frames, they do not include the protocol conversion functionality present in the edge routers 216, 218. Groups of routers 216, 218, 222, 224, 226, 228 managed by a single administrator is often called an Autonomous System (AS). The Internet includes several AS which are connected to each other. Each AS may include one or more DHCP (Dynamic Host Configuration Protocol) servers which are responsible for assigning IP addresses to host devices connected to the AS. In FIG. 2, a single DHCP server 220 is shown coupled to edge routers 216, 218

Unlike LANs which use data link layer addresses, the Internet uses Layer 3 (Network layer) addresses, e.g., IP Addresses, for purposes of identifying source and destination devices and determining the appropriate route upon which packets should be transmitted. Source and destination IP addresses are included, along with data, in IP packets used to transmit information across the Internet. Every host and router on the Internet has an IP address which encodes its IP network number and host number. The combination is unique, no two machines have the same IP address.

Exemplary IP addresses are 32 bits long and are used in the Source address and Destination address fields of IP packets. FIG. 3 is a diagram 300 which illustrates the standard 32 bit format for IP addresses. Note that host addresses are divided into different classes (A, B, C) with different numbers of bits allocated to the network number and host portion number in each address class. From a management perspective, system administrators may divide the host number portion of a 32 bit IP address into a subnet portion 402 and a host portion 404 as illustrated in block 400 of FIG. 4. In such embodiments, within the network defined by the network portion of the IP address, a subnet mask is used at the routers within the network to distinguish between the host portion 404 and the rest of the 32 bit IP address and thereby allow for routing within the network based on the subnet portion of the address.

The demand for IP address continues to grow and, with fewer bits than are used for MAC addresses, there are considerably fewer IP addresses available for allocation. Given the demand for IP addresses and the limited supply, IP addresses are leased from a central authority responsible for overseeing their allocation. Internet service providers, may lease a large number, e.g., a block of IP addresses, which the provider then sub-leases to end users, e.g., host devices.

As a result of the lease (actually the sub-lease) process, end users obtain an IP address which is subject to lease restrictions including the right to use the IP address for a limited period of time. IP addresses leased for extended periods of time, e.g., a year or more, are often termed "static" IP addresses. Static IP addresses are used for applications such as Web site hosting where the Internet connection is likely to remain active and in use for extended periods of time. Users normally pay a premium for static IP addresses.

With regard to individual Internet users, IP addresses are more commonly leased to end users on a dynamic basis. Internet service providers frequently use a DHCP server to assign users IP addresses for a limited lease time when they seek to access the Internet, e.g., from a host device coupled to the Internet by way of a Layer 2 network. FIG. 2 illustrates a single DHCP server 220 coupled to the two edge routes 216, 218 to oversee IP address allocation. In practice, the Layer 3 network 202 may include multiple DHCP servers with each server being responsible for allocating IP addresses to users on a different network or subnet. The system administrator responsible for overseeing an AS determines the relationship between DHCP servers, sets of IP addresses allocated by each of the DHCP servers and the edge routes which connect users to the DHCP servers for IP address assignment.

Once an IP address is leased to a host, e.g., user, if the host remains active beyond the lease term, the lease may be extended or a new IP address assigned to the host from the available pool of IP addresses at the end of the first lease term.

When a user intends to stop using the IP address, the user's device, e.g., host device 208, normally signals to the DHCP server that assigned the IP address that the address is being released. This allows the address to be added to the pool of available addresses and reused. In the event that a release message is not received prior to the IP address lease timing out, and the DHCP server encounters a shortage of addresses in the pool of available addresses, the DHCP server may poll devices to which it allocated IP addresses to see if they are still active. Failure to receive a response may result in the DHCP adding the IP address assigned to the non-responding device back into the pool of available IP addresses.

Thus, unlike MAC address which are fixed for the life of a product by the manufacturer, the IP address assigned to a particular host device can change from moment to moment. Accordingly, in contrast to MAC addresses which are fixed for the life of a product by the manufacturer, there is no permanent fixed relationship between a physical device and the IP address assigned to the device.

Many contemplated IP applications could benefit from reliable information about the location and/or identity of a host device using an IP address. The dynamic allocation of IP addresses and re-use of IP addresses discussed above, greatly complicates attempts to accurately correlate specific devices and/or physical locations with an IP address.

The problem of associating IP addresses with physical locations is further complicated by the manner in which IP addresses are assigned and used. Blocks of IP addresses are assigned by the central authority to different network providers based on the size of their networks. Unlike zip codes or telephone number area codes, assignment of IP addresses is independent of geographic location. Accordingly, IP addresses do not inherently convey geographic location information as do, for example, zip codes used by the post office or the area code portion of a telephone number.

Reliable location information is also difficult to obtain in an IP network because IP based routing relies, in most cases, on the intelligence of the network to determine the routing path to a specified destination address. The host need not, and in most cases does not, know the physical location of the destination device to which it is sending packets or the route over which the transmitted packets will be conveyed. In addition, routers in an IP network usually only need to determine the next router in a path based on an IP address and therefore often do not include detailed topology information relating to large portions of an IP network. While shielding end devices and routers from having to make end to end routing decisions has many advantages, the lack of information about the physical devices corresponding to IP addresses poses problems in many contemplated IP based applications.

IP based services, those based on private internets and the larger Internet are continuing to grow in importance. IP and the Internet are beginning to be used for a wide range of applications such as music file sharing, news delivery, software distribution, etc. IP and Internet applications which are expected to grow in importance in the future include Internet telephony and video on demand services. In the case of Internet telephony voice signals are exchanged over the Internet through the use of packets including voice data. In the case of video on demand (VoD) services, video in the form of digital files transmitted as packets, is supplied to a customer using the Internet as the transport mechanism.

In many cases, it would be useful if the physical location of a device using an IP address could be determined from its IP address. One particularly relevant and important application where IP device location is important is the servicing of IP telephony calls by emergency service call centers such as 911 call centers.

Unfortunately, there is currently no simple way to convey physical location information to a 911 operator from an IP network. Accordingly, not only does determining the originating location of an IP call present problems but conveying such location information to an operator along with an IP based 911 call is particularly challenging.

In the case of existing 911 service for landline phones, calling party telephone number information is forwarded over the PSTN to a 911 emergency call center as part of the standard automatic number identification information provided as part of standard SS7 signaling associated with a telephone call. The emergency call center uses the calling party's telephone number to access a 911 database which correlates telephone numbers to physical locations, e.g., the address of the telephone service subscriber to which the telephone number is assigned. Entries in the 911 telephone number/location database are updated infrequently, e.g., usually with the assignment or reassignment of a landline telephone number. Usually the information for a specific telephone number is entered at the time the telephone number is assigned and frequently remains unmodified until telephone service for the particular number is discontinued. Currently there is no easy way to frequently update the contents of the existing 911 location information databases to reflect a phone, e.g., an IP phone, being moved from location to location.

In view of the above discussion, there is a need for methods and apparatus for providing calling party location information to an emergency 911 service center when the center is servicing a call associated with an IP telephony device. It is desirable that such location information can be provided in a way that avoids the need to make significant or costly modifications to current 911 location information database systems or to add significant amounts of hardware to such systems. From the emergency service center perspective, it would be ideal if accurate location information could be obtained regardless of whether a call is placed from an IP telephony device or a landline phone in the same manner that location information is currently retrieved for landline calls.

SUMMARY OF THE INVENTION

The present invention is directed to methods and apparatus for providing location information to an emergency call center, e.g., a 911 call center, for calls placed from IP telephony devices.

In accordance with the invention IP phones register with an IP switch, e.g., a soft switch, which has access to stored information associating the IP phone's telephone number with an IP address. The IP address assigned to a phone may vary at any specific point in time, e.g., depending on factors including which router port is used to couple the phone to the IP network. Since IP addresses can be assigned dynamically, each time an IP phone is reconnected to the IP network, the IP telephony device updates the IP address information associated with its assigned telephone. Calls to/from an IP telephone are then directed based on the updated IP address information maintained by the soft switch.

As a result of the soft switch registration process calls to an IP telephone number may be routed from/to different locations at different times depending on the physical location of an IP telephony device. Accordingly, an IP phone number, unlike a landline number, normally does not have a fixed physical location associated with it and therefore does not provide accurate location information since the phone number is not tied to a specific location.

In accordance with the present invention, for purposes of servicing emergency calls, e.g., for E-911 purposes, a telephone number is associated with each edge router port associated with a specific location, e.g., office, residence, etc., that may be used to support an IP telephone. A telephone number associated with the edge router port and the corresponding location information is stored in an emergency location information database, e.g., an existing database used for providing 911 calling party location information for calls from landline phones. The telephone number may be, e.g., the number of a landline phone located at a customer premise location to which the edge router port is connected or a telephone number which is not actually used to provide telephone services but is used, in accordance with the present invention, as a way of conveying location information. Normally the telephone number associated with the edge router port will be different than the telephone number associated with an IP phone for purposes of routing calls to the IP phone.

When the soft switch of the present invention used for routing IP calls detects a telephone call to an emergency call center, e.g., a 911 call, it determines the edge router port from which the call was made.

This can be done using the IP address associated with the calling party's IP telephone and the techniques discussed below. Once the edge router port is identified, the soft switch performs a look-up operation to determine the telephone number associated with the port for emergency call purposes. This telephone number may correspond to a telephone which is not registered to the IP caller. In fact, it may even correspond to a telephone number which is not even in active use for placing and/or receiving calls. Significantly, however, the telephone number associated with the utilized edge router port corresponds to the location from which the IP telephony call is placed, e.g., the location of the customer premise corresponding to the edge router port through which the IP call was received.

The IP based call to the emergency call center, referred to herein for purposes of explanation as a 911 call, is routed to PSTN by an IP to PSTN gateway with the telephone number retrieved from the look-up operation being supplied as the calling party number instead of the actual calling party number. Upon receiving the 911 call, the 911 service center performs an address look-up operation using the supplied calling party number in the normal manner. This results in the address associated with the port from which the IP-based call was placed being supplied to the 911 operator along with the voice portion of the IP telephone call. This calling party number can be used to determine the physical location of the calling party.

Significantly, hardware modifications to existing emergency location information databases which associate telephone numbers with customer premise locations are not required to implement the present invention. The location information databases merely need to be loaded with telephone numbers, and corresponding physical customer premise location information, that are associated in accordance with the present invention with edge router ports used to provide IP telephony service. Such telephone number and address information may be loaded into the 911 database at the time IP service is initially provisioned for a customer premise and left unchanged until service to the customer premise through the port is terminated. Thus, updates to the emergency location information database corresponding to individual customer premises through which IP telephone service may be provided can be relatively infrequent, e.g., the same or about as frequent as the data base is updated in regard to landline phones.

Accordingly, without requiring modifications to the existing PSTN portion of the 911 system, emergency service telephone operators can be supplied with location information for IP based calls. This information can then be used, e.g., to dispatch emergency services to the source of the call to the 911 telephone call.

Numerous additional embodiments, features and applications for the methods and apparatus of the present invention are discussed in the detailed description that follows.

DETAILED DESCRIPTION

Figure 1:
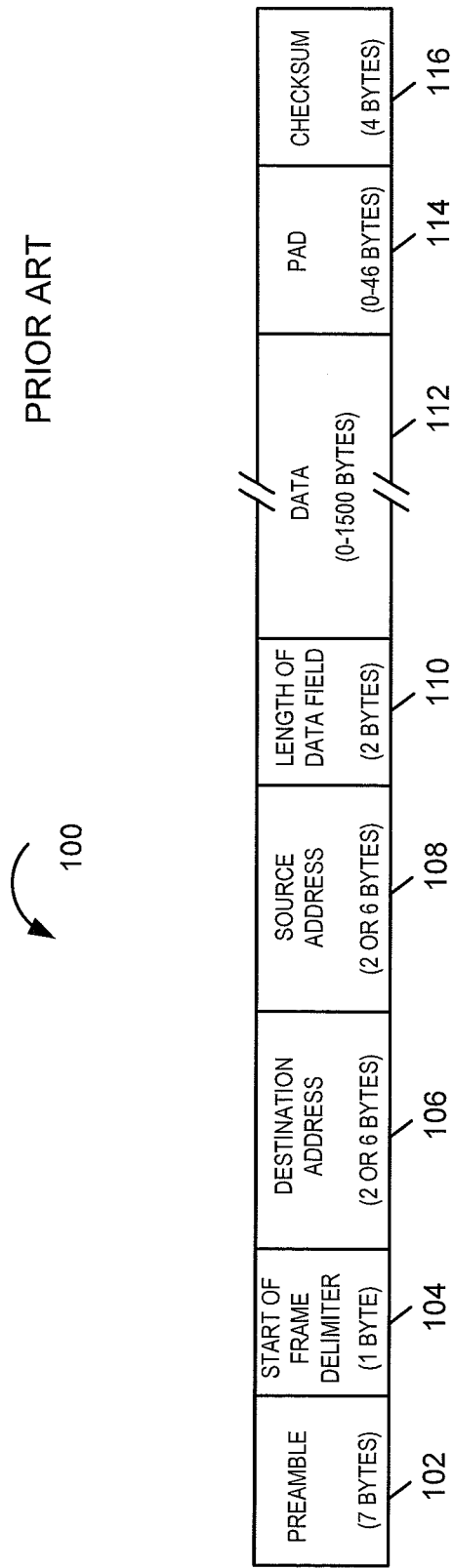
FIG. 1 illustrates an Ethernet frame.
Figure 2:
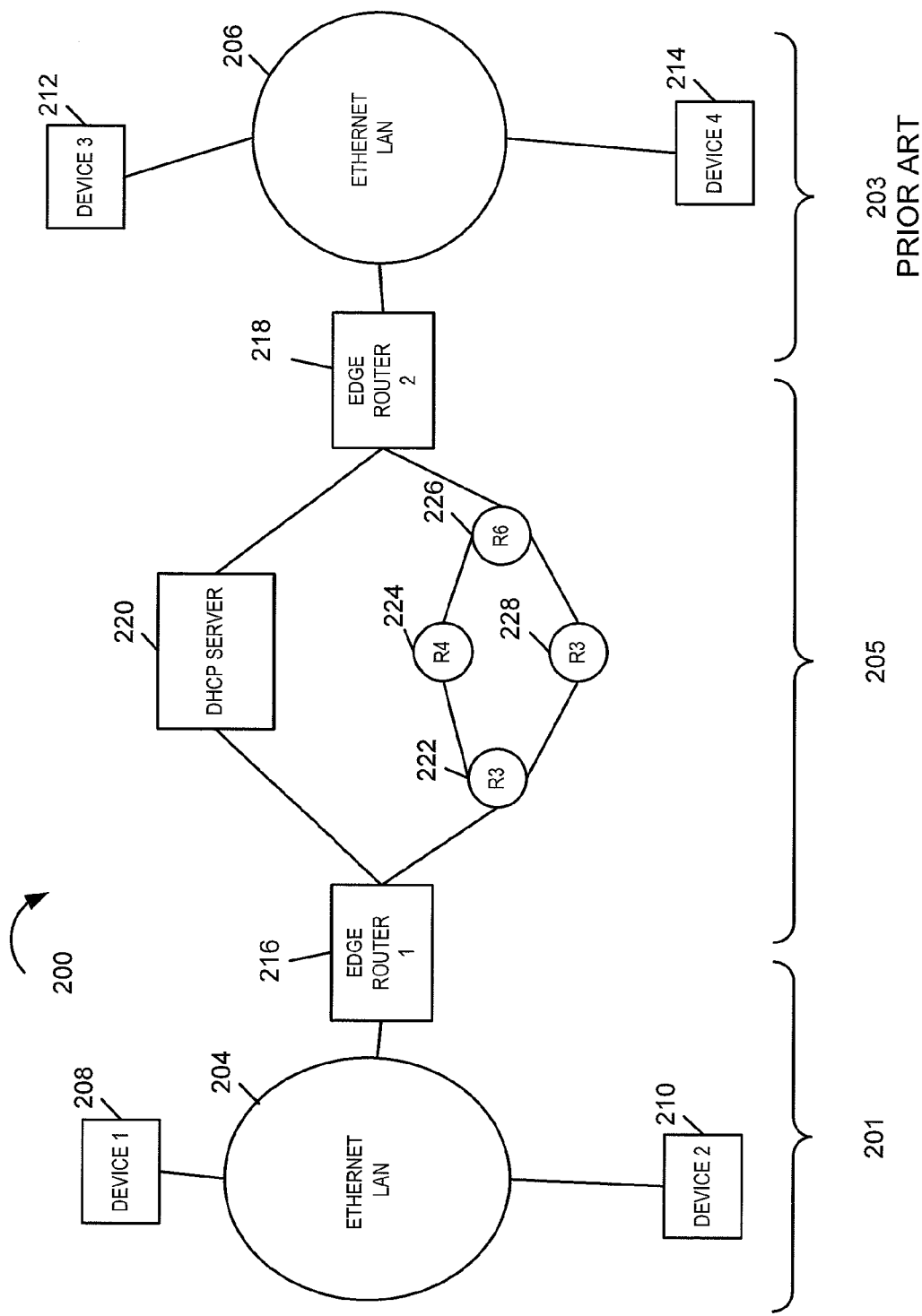
FIG. 2 is a simplified Internet diagram.
Figure 3:
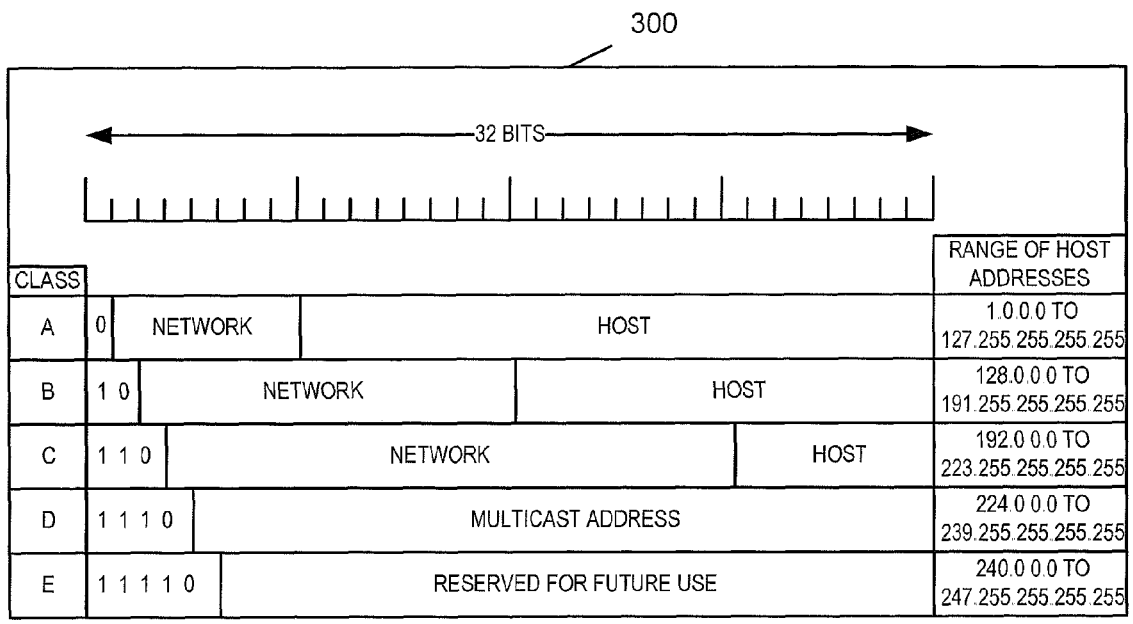
FIG. 3 illustrates the 32 bit IP addressing scheme used for Internet addresses.
Figure 4:
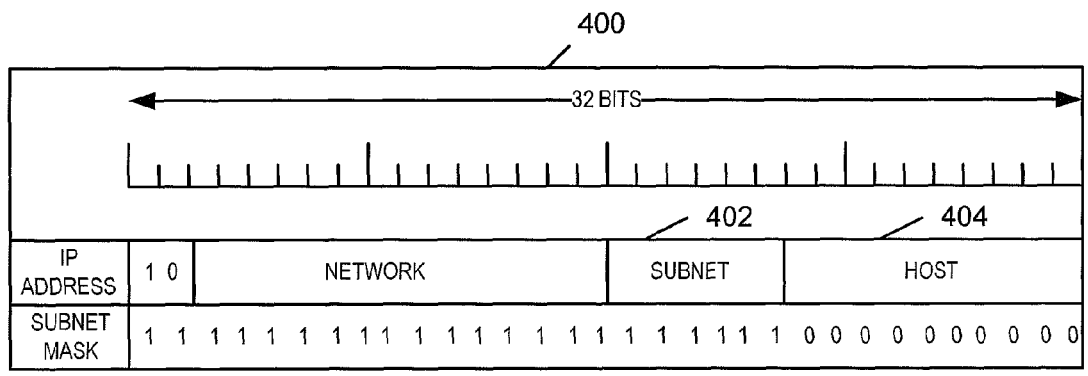
FIG. 4 illustrates the components of a 32 bit Internet address having the illustrated subnet mask.
Figure 5:
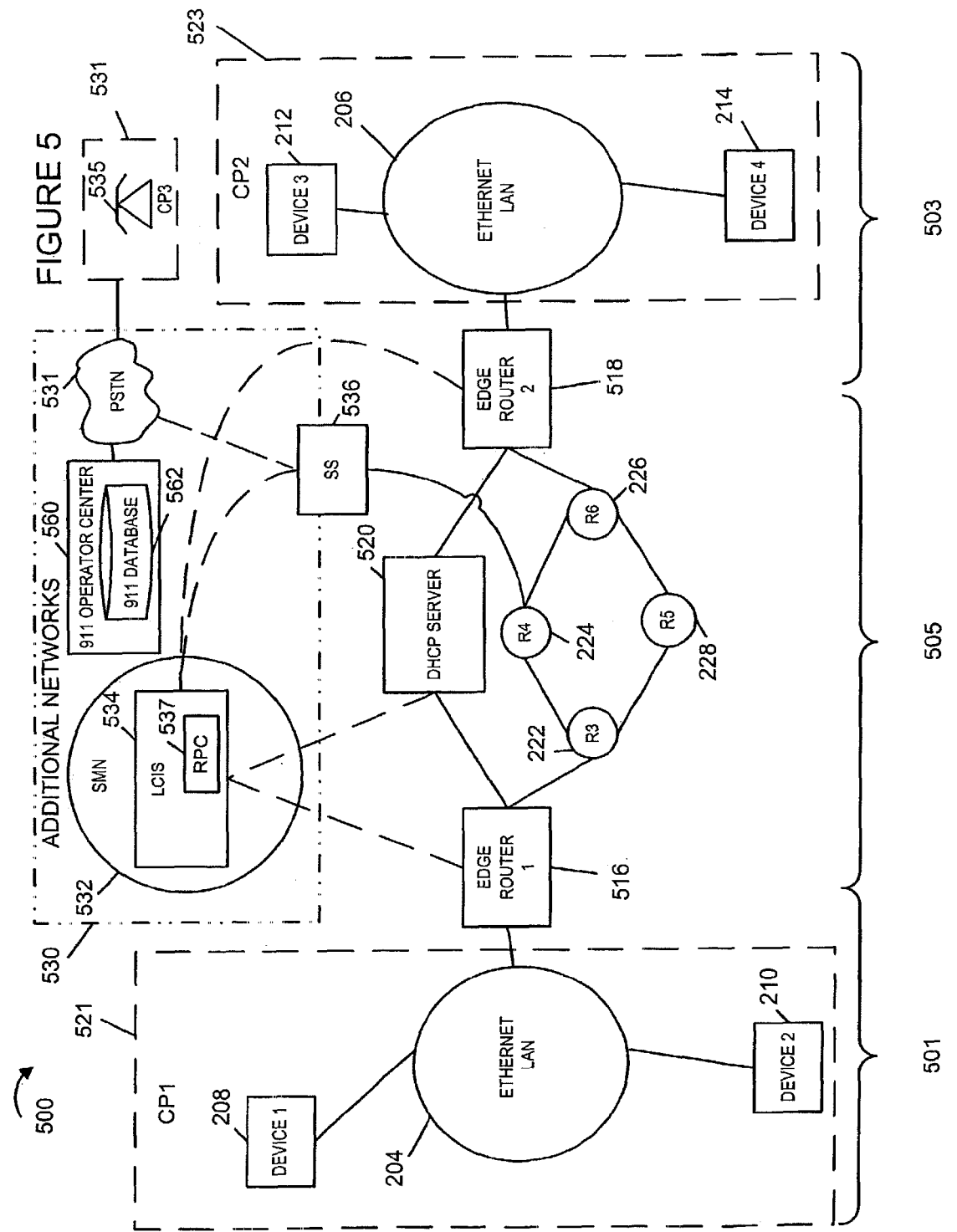
FIG. 5 illustrates a communications system implemented in accordance with the invention.

FIG. 5 illustrates a communication system 500 implemented in accordance with the present invention. As will be apparent from a review of FIG. 5, the communication system 500 has many elements which are the same as or similar to the elements of the existing Internet as shown in FIG. 2. Elements in FIG. 2 and FIG. 5 which are the same as, or similar to, one another are indicated using the same reference numbers in both figures. Such elements will not be described again in detail.

The system illustrated in FIG. 5 includes first and second Layer 2 networks 501, 503, e.g., Ethernet LANs, coupled together by a Layer 3, e.g., IP based, network 505. In addition to the IP based network 505, the system 500 includes additional networks 530 and customer premises 533 which are in addition to the layer 3 network 505. The additional networks include a service management network (SMN) 532 and a public switched telephone network 531. One or more conventional (e.g., non-IP) telephone devices 535 may be coupled to the PSTN 531. In FIG. 5, for purposes of illustration, a single telephone 535, located at a customer premise 533, is shown coupled to the PSTN 531. In practice many such telephone devices located at different customer premises are normally coupled to the PSTN 531.

The first Layer 2 network, e.g., LAN 501, includes host devices 208, 210 coupled to Ethernet bus 204. The LAN 501 is located at a first customer premise (CP) 521. Similarly, the second Layer 2 network 503 including host devices 212, 214 coupled to Ethernet bus 206. The LAN 503 is located at a second CP 523. Each CP 521, 523, corresponds to a single physical location, e.g., an office building or home, for which location information can be stored in the SMN 532.

An IP based network 505 couples the first and second Layer 2 networks 501, 503 together. The IP based network 505 includes first and second edge routers 516, 518, a DCHP server 520, core routers 222, 224, 226, 228 and a soft switch (SS) 536.

The first and second edge routers 516, 518 serve as the interface between the Ethernet LANs 501, 503, respectively, and the IP 505. While the edge routers 516, 518 perform the same functions as edge routers 216, 218 as will be discussed further below, they also include routines for responding to requests to identify a router port corresponding to an IP or MAC address supplied as part of a port information request.

The DHCP server 520 is responsible for dynamically assigning IP addresses while the SS 536 is responsible for interfacing between the IP network 505 and public switched telephone network (PSTN) 531. The soft switch stores information associating IP address of telephone devices with telephone numbers. It is responsible for routing IP telephone calls between IP telephone devices over the IP network 505 and for performing the necessary protocol conversions required to bridge and route telephone calls between the IP domain and the PSTN 531. Routing of telephone calls between the IP and PSTN domains may be required, e.g., when a telephone call between an IP device and a conventional PSTN telephone occurs.

To facilitate the secure exchange of customer and management information between system components, e.g., routers and servers in the system 500, the system 500 includes a secure management network (SMN) 532. The SMN 532, which may be implemented using IP, is in addition to the Layer 3 network 505.

As an alternative to using a separate network for the exchange of management and customer information, secure communications channels can be implemented between system components, e.g., routers and servers, using encryption and/or other virtual private networking techniques. Accordingly, customer and management may be transmitted over separate physical communications channels or secure communications channels provided using existing communications links between network elements.

Various elements are incorporated into the SMN 532 including a location and customer information server (LCIS) 534 implemented in accordance with the invention. As will be discussed below, in accordance with the present invention, the LCIS 534 includes a router-port to customer information (RPC) database 537. The RPLC database 537 includes sets of customer records created, e.g., when a customer subscribers to an IP service provider. As will be discussed below each record may include, e.g., customer premise location information, name, address and landline telephone number information. Each customer record is correlated to an edge router and port which is assigned to be used by the customer when accessing the IP network via a LAN or other connection.

For various applications, e.g., servicing of 911 emergency telephone calls, the SS 536 and/or other network devices coupled to the SMN 532 may request the location and/or other customer information associated with a particular IP address of interest, e.g., the IP address used to initiate a 911 calls from an IP telephone. As will be discussed below, the LCIS 534 includes routines for responding to such information requests.

An emergency call center, e.g., a 911 operator center 560, is coupled to the PSTN 531. While a single 911 operator center 560 is shown, it is to be understood that there may be several 911 operator centers located across the country which service different geographic areas. These 911 operator centers 560 provide emergency telephone services, e.g., dispatching firemen and/or ambulances. The 911 operator center 560 includes a location information database shown in FIG. 5 as a 911 database 561. The location information database 561 includes phone numbers and corresponding customer premise addresses. A 911 telephone operator handling an emergency call can access the database 561 using a calling party's telephone number obtained from ANI information associated with the voice portion of an incoming call in accordance with standard SS7 signaling, and retrieve from the database the location of the caller. This is particularly useful in cases where the 911 caller in unable to tell the operator their current location, e.g., as a result of becoming incapacitated or because of a lack of knowledge.

The exemplary communication system 500 shows the 911 database 562 located inside the 911 operator center, but it is possible, in alternate embodiments, for the 911 database to be located at a remote location, where several 911 operator centers could share the same database 561.

Figure 6:
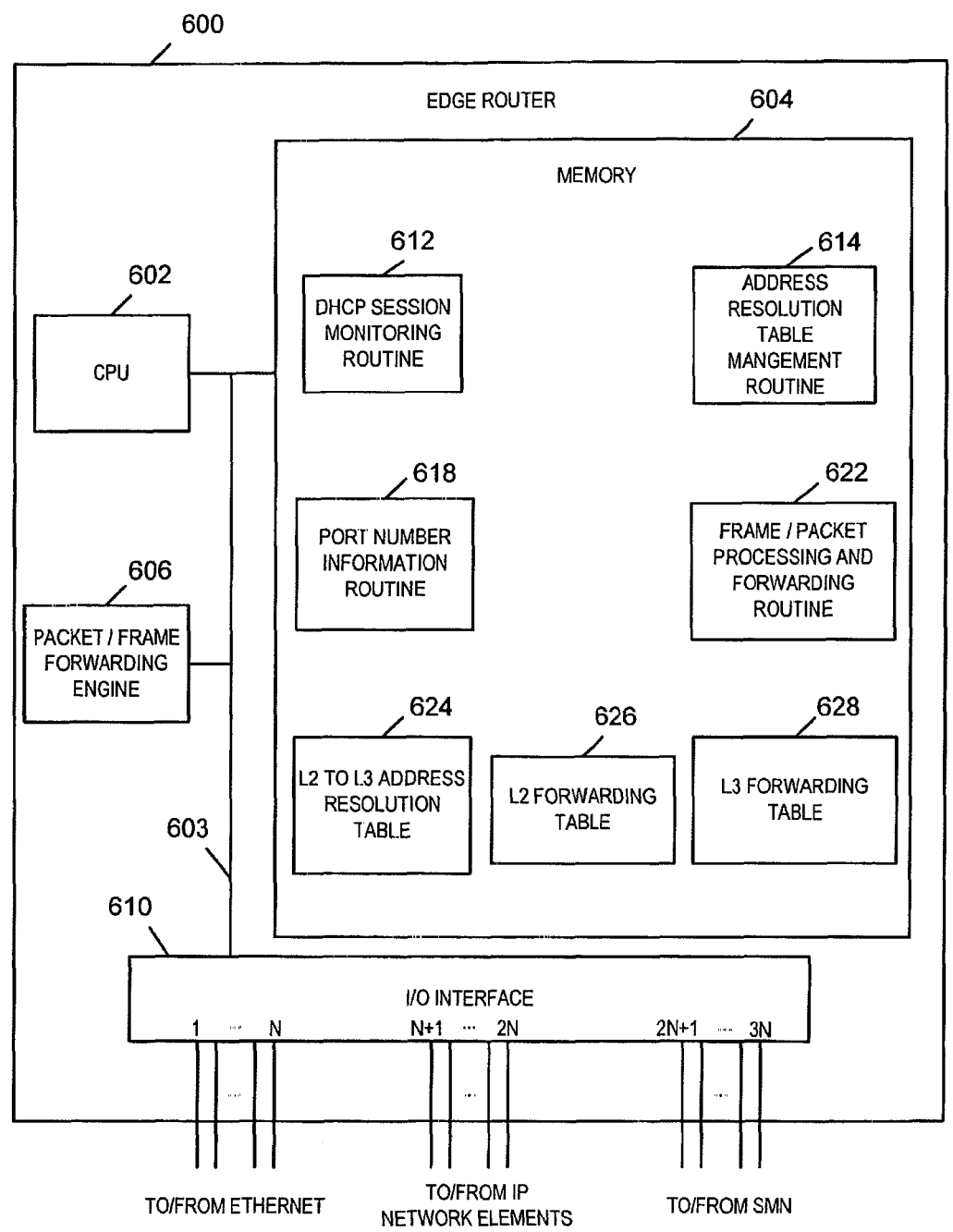
FIG. 6 illustrates an edge router implemented in accordance with the invention.

In accordance with the present invention, the location information database 561 includes a plurality of landline telephone numbers with an address being associated with each of the landline telephone numbers. It also includes a plurality of telephone numbers used, in accordance with the present invention, to convey address information associated with edge router ports that may be used by IP telephony devices. In the case where a landline phone exists at the location associated with an edge router port, an additional entry for the router port need not be entered in the database 561 with the landline telephone number and address information being sufficient, with calling party number information supplied in accordance with the invention, to convey to an emergency service operation the address associated with a particular IP call from that location. In cases where a landline phone does not exist at the customer premise to which a edge router port which may be used for IP telephony calls is coupled, a dummy telephone number is entered in the database 561 along with the corresponding location of the customer premises from which IP calls may be placed through the router port associated with the dummy telephone number. As will be discussed below, by supplying the dummy number as the calling party number for IP calls placed to the 911 service center, the soft switch of the present invention makes it possible for the 911 operator to retrieve location information corresponding to the origin of an IP call even when a landline phone is not present at the location where the IP call originated. FIG. 6 illustrates an edge router 600 which may be used as any one of the edge routers 516, 518 of the system illustrated in FIG. 5. As illustrated, the edge router 600 includes a CPU 602, packet/frame forwarding engine 606, memory 704 and I/O interface 610 which are coupled together by a bus 603. The I/O interface 610 includes a plurality of ports used to connect the edge router 600 to various networks. Ports 1 through N are used to couple the router 600 to one or more Ethernet LANs. Ports N+1 through 2N are used to connect to elements of the IP network 505, e.g., DHCP server 520 and router R3 522 or R6 526, while Ports 2N+1 through 3N are used to coupled the edge router 600 to the SMN and thus the LCIS 534 included therein.

The memory 604 includes, an L2 forwarding table 626, an L3 forwarding table 628, an L2 to L3 address resolution table 624, a frame/packet processing and forwarding routine 622, a DHCP session monitoring routine 612, address resolution table management routine 614, and port number information routine 618.

The Layer 2 forwarding table 626 includes information used for forwarding received Ethernet frames according to the MAC destination address specified in the frame's header.

Figure 7:
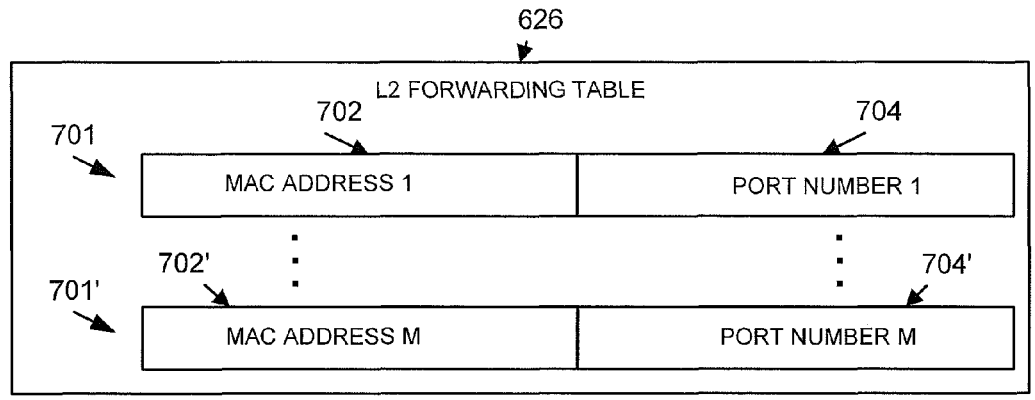
FIGS. 7-9 illustrate various tables included in the edge router of FIG. 6.

FIG. 7 illustrates an exemplary L2 forwarding table 626. The table includes a plurality of entries 701, 701'. Each entry includes a MAC address 702, 702' and a port number 704, 704'. Under direction of the forwarding routine 622, frames received by the edge router having a MAC address listed in the L2 forwarding table are output using the port 704, 704' corresponding to the destination MAC address. In this manner Ethernet frames are forwarded in the Layer 2 domain based on MAC destination addresses.

Figure 8:
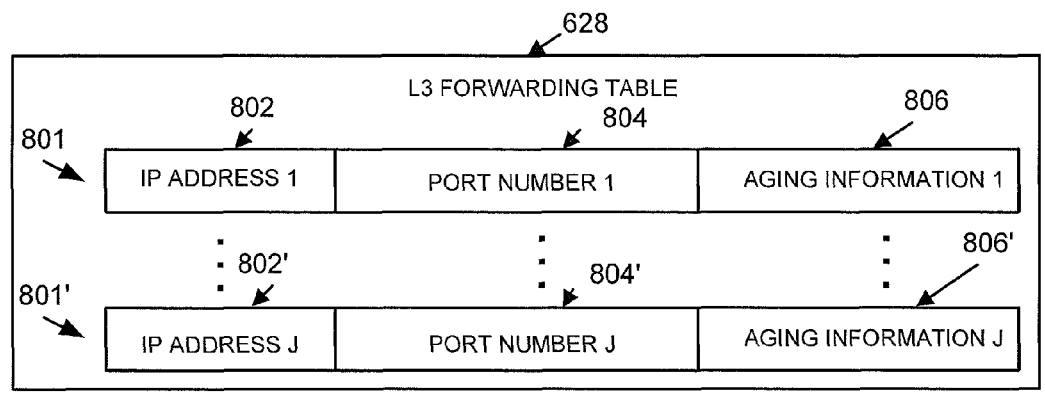

The Layer 3 (L3) forwarding table 628 is used by the router 600 to forward IP packets in the IP domain. As illustrated in FIG. 8, the L3 forwarding table includes a plurality of entries 801, 801'. Each entry includes an IP address 802, 802', a port number 804, 804' and aging information. The aging information is used to determine when an entry 801, 801' should be deleted from L3 forwarding table as part of a table maintenance operation. Under direction of the forwarding routine 622, IP packets received by the edge router 600 having a MAC address listed in the L2 forwarding table are output using the port 804, 804' corresponding to the destination IP address. In this manner IP packets are forwarded in the Layer 3 domain based on IP addresses.

Figure 9:
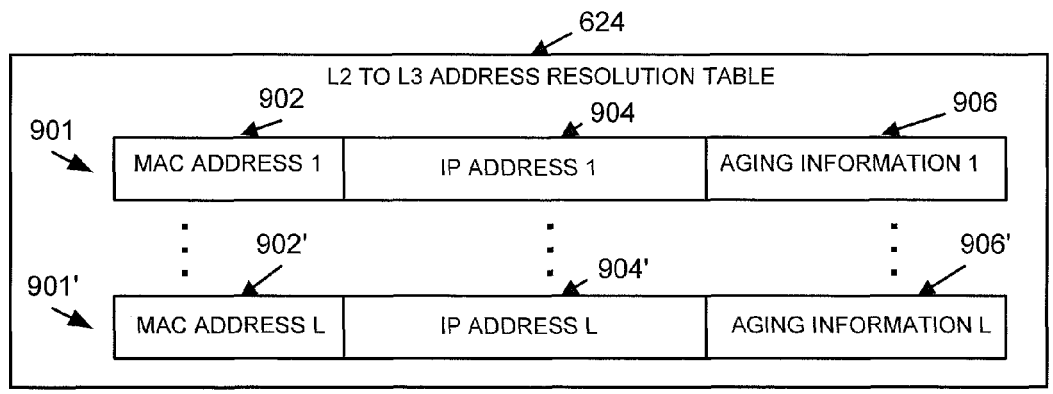

The L2 to L3 address resolution table 624, shown in FIG. 9, is used for converting between Layer 2, e.g., MAC, addresses and Layer 3, e.g., IP, addresses. The L2 to L3 address resolution table 624 includes a plurality of entries 901, 901'. Each entry includes a MAC address 902, 902', an IP address 904, 904' and aging information 906, 906'. As in the case of the L3 forwarding table 628, the aging information 906, 906' is used for table maintenance purposes.

When an IP packet is received which has a destination address not found in the L3 forwarding table 628, the forwarding routine 622 compares the received IP destination address to the entries in the L2 to L3 resolution table 624. If the IP address is listed in the table 624, the MAC address 902 or 902' corresponding to the received destination IP address 904 or 904', respectively, is retrieved from the L2 to L3 address resolution table. The MAC address is then used in a L2 forwarding table look-up operation. Using the MAC address as an index to the L2 forwarding table, an output port to be used for forwarding the information included in the received IP packet is determined. As part of the forwarding operation, content from the received IP packet is placed into the payload of an Ethernet frame and then transmitted to the appropriate Ethernet LAN via the port identified in the L2 forwarding table. In this manner, IP packets received from the IP network can be transmitted to devices over the Ethernet LAN coupled to the edge router 600.

In accordance with one feature of the invention, as an alternative to using address resolution protocol (ARP), the DHCP monitoring routine 611 snoops DCHP sessions between devices on the Layer 2 network, e.g., devices 208, 210 and the DHCP server 220. In this manner, the monitoring routine 611 obtains information on the assignment of IP addresses to devices and the release of IP address by devices. This information is conveyed to the address resolution table management routine 614 which updates the layer 2 to layer 2 (L2 to L3) address resolution table 624.

Address resolution table management routine 614 is responsible for removing, e.g., deleting, entries from the L2 to L3 address resolution table 624 and/or L3 forwarding table, after an entry has aged for a preselected period of time as indicated from the aging information stored for each entry. Alternatively, in the case where DCHP sessions are snooped in accordance with one feature of the invention, entries are deleted tables 624 and 628 when the IP lease time expires, a device releases an IP address, or a device fails to respond to a DHCP status inquiry. Thus, in such an embodiment, IP address entries are added to and deleted from tables 624, 628 based on information obtained from snooping communications between host devices on a layer 2 LAN coupled to the edge router 600 and the DHCP server 220.

Port number information routine 618 responds to port number information requests received by the edge router 600 by returning the port number corresponding to an IP address or MAC address received in a port number information request.

The routine 618 first determines whether an IP or MAC address has been received in a port number information request. If the request includes a MAC address, the received MAC address is used as an index into the L2 forwarding table to determine the router port corresponding to the received address. If an IP address is received as part of a port number information request, the IP address is first used as an index as part of a look-up into the L2 to L3 address resolution table 624. In this manner the MAC address corresponding to the received IP address is determined from the table 624. Once the MAC address is determined from table 624 it is used to consult the L2 forwarding table 626. In this manner, the router port corresponding to the MAC address is determined.

The router port number determined by port number information routine 618 is returned to the device which sent the router 600 a port number information request. In the case of a port number information request from the LCIS 534, the determined port number would normally be returned via the secure SMN 532 via which the request was received by the edge router 600.

Figure 10:
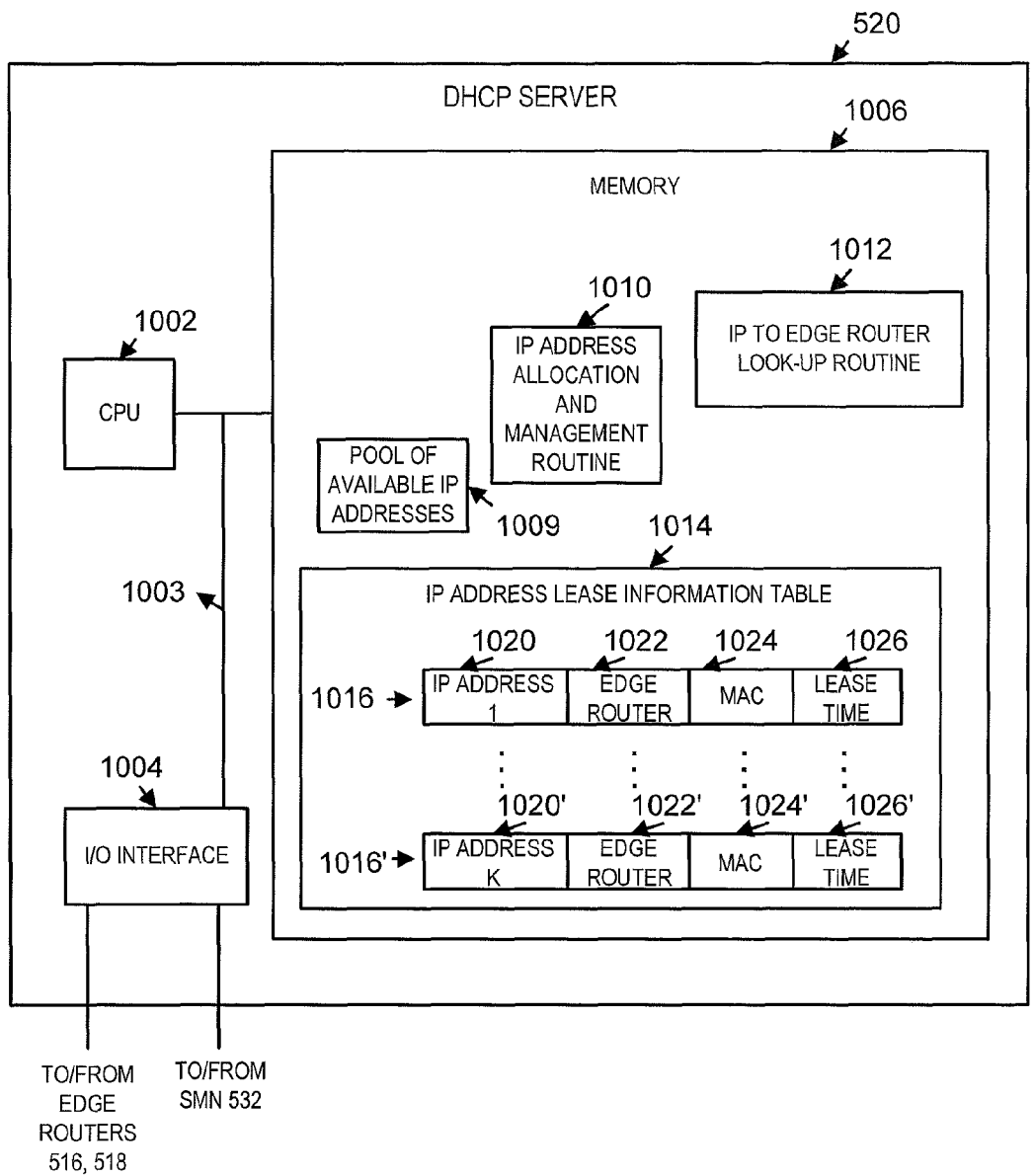
FIG. 10 illustrates a DHCP server responsible for dynamically assigning IP addresses and for storing information relating to said addresses in accordance with the present invention.

FIG. 10 illustrates a DHCP server 520 implemented in accordance with the present invention. As illustrated, the DHCP server 520 includes a CPU 1002, I/O interface 1004 and memory 1006 which are coupled together by bus 1003. The memory 1006 includes an IP address allocation and management routine 1010, IP to edge router and optionally MAC address look-up routine 1012, a pool of available IP addresses 1009, and an IP address lease information table 1014. The pool of available IP addresses 1009 is a list of unused IP addresses which the DHCP server 520 is authorized to lease to requesting devices. In accordance with the invention, the table 1014 is used to manage leased IP addresses and as an IP to edge router (IP2ER) look-up table for providing information on the edge router associated with an IP addresses.

When a device on a LAN, e.g., device 208 on LAN 204, needs an IP address so that it can access the IP network 505 it broadcasts an IP address assignment request. The request is detected by the edge router on the LAN, e.g. router 216. The edge router 516 responds by acting as a proxy of the requesting device 208 and initiating a DHCP session with the DHCP server 520.

This may be done as is known in the art using DHCP protocol. An IP address assignment request conveyed to the DHCP server 520 includes the MAC address of the requesting device. In response to an IP address assignment request, the DHCP server 520 assigns the requesting device 208 an available IP addresses from the pool 1009. In addition the server 520 removes the address from the pool 1009 and creates a new entry 1016 in the IP address lease information table 1014.

Each entry 1016, 1016' in the table 1014 includes the IP address assigned 1020, 1020', the edge router 1022, 1022' acting as proxy for the requesting device, the MAC address 1024, 1024' of the device to which the IP address was assigned, and lease time information 1026, 1026'. The lease time information 1026, 1026' indicates the term, e.g., duration, of the IP address lease and other lease related information. One entry 1016 or 1016' exists in the table 1014 for each IP address leased to a device by the DHCP server 520. In the exemplary embodiment of FIG. 10, the table 1014 includes entries for K leased IP addresses 1620 through 1620'.

When an IP address is assigned, i.e., leased, to a requesting device, the IP address and lease time information (indicating the duration of the lease) is communicated back to the requesting device by way of the edge router acting as the device's proxy.

Accordingly, as part of the DHCP server IP address leasing mechanism, a table 1014 associating assigned IP addresses with information identifying the edge router used by the device assigned the IP address to access the IP network 505 and the devices MAC address.

Edge router information requests, e.g., requests from the LCIS 534, may be received by the DHCP server 520 via SMN 532. IP to edge router look-up routine 1012 is responsible for responding to such requests by correlating an edge router to an IP address received in the information request. To determine the edge router corresponding to an information request, the look-up routine 1012 accesses the IP address lease information table 1014 using the received IP address as an index into the table. In this manner, the look-up routine 1012 retrieves the information 1022, 1022' identifying the edge router corresponding to the received IP address. In some embodiments, the routine 1012 also recovers from the table 1014, the MAC address corresponding to the received IP address. The information identifying the edge router, and, optionally, the MAC address, corresponding to a received IP address is returned to the device, e.g., LCIS 534, which sent the edge router information request to the DHCP server. In this manner, devices such as the LCIS can obtain from the DHCP server information identifying the edge router being used by a device having a specific IP address.

Figure 11:
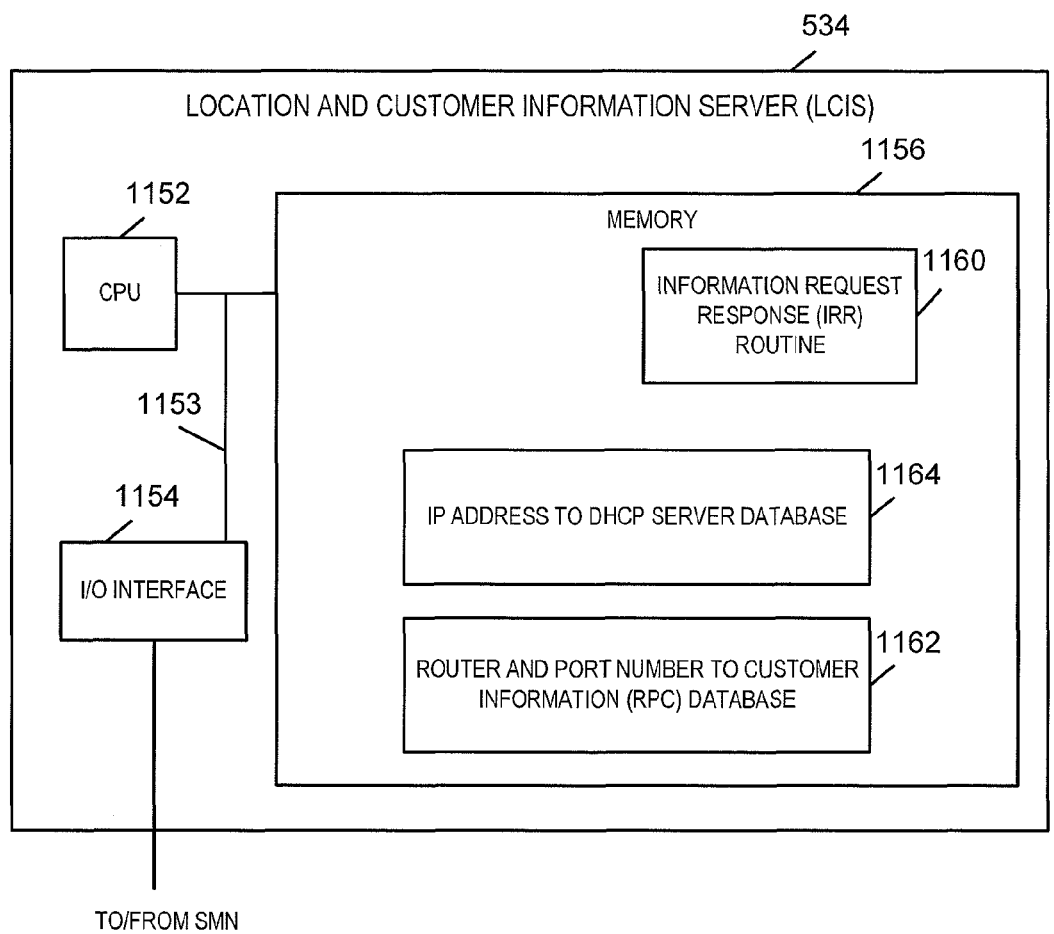
FIG. 11 illustrates a location and customer information server (LCIS) implemented in accordance with the invention.

FIG. 11 illustrates a location and customer information server (LCIS) 534 implemented in accordance with the invention. For security reasons, the LCIS 534 is implemented as part of the SMN 532. However, it could, alternatively, be implemented as a device on the IP network 505 assuming sufficient security measures are taken, e.g., the use of a firewall and/or data encryption, to protect the server and its contents from unauthorized access and/or tampering.

The LCIS 534 includes a central processing unit 1152, I/O interface 1154 and memory 1156 which are coupled together by bus 1153. The CPU 1152 controls operation of the LCIS under direction of one or more routines stored in memory 1156. The I/O interface 1154 couples the internal components of the LCIS 534 to external devices via the communications links of the SMN 532. For example, in the FIG. 5 embodiment, the LCIS 534 is coupled to the edge routers 516, 518, SS 536 and DHCP server 520 via communications links of the SMN 532.

The memory 1156 includes an IP address to DHCP server database 1164, and an edge router and port number to customer information (RPC) database 1162, and an information request response routine 1160.

The IP address to DHCP server database 1164, includes information correlating IP addresses which may be assigned by DHCP servers to particular DCHP servers in the IP network. Thus, the LCIS 534 is able to determine which DHCP server 520, out of a plurality of such servers, to contact for information regarding an IP address received as part of an information request.

The RPC database 1162 includes information correlating specific edge routers and ports to customer information including, e.g., physical location, name and landline telephone number information.

Figure 12:
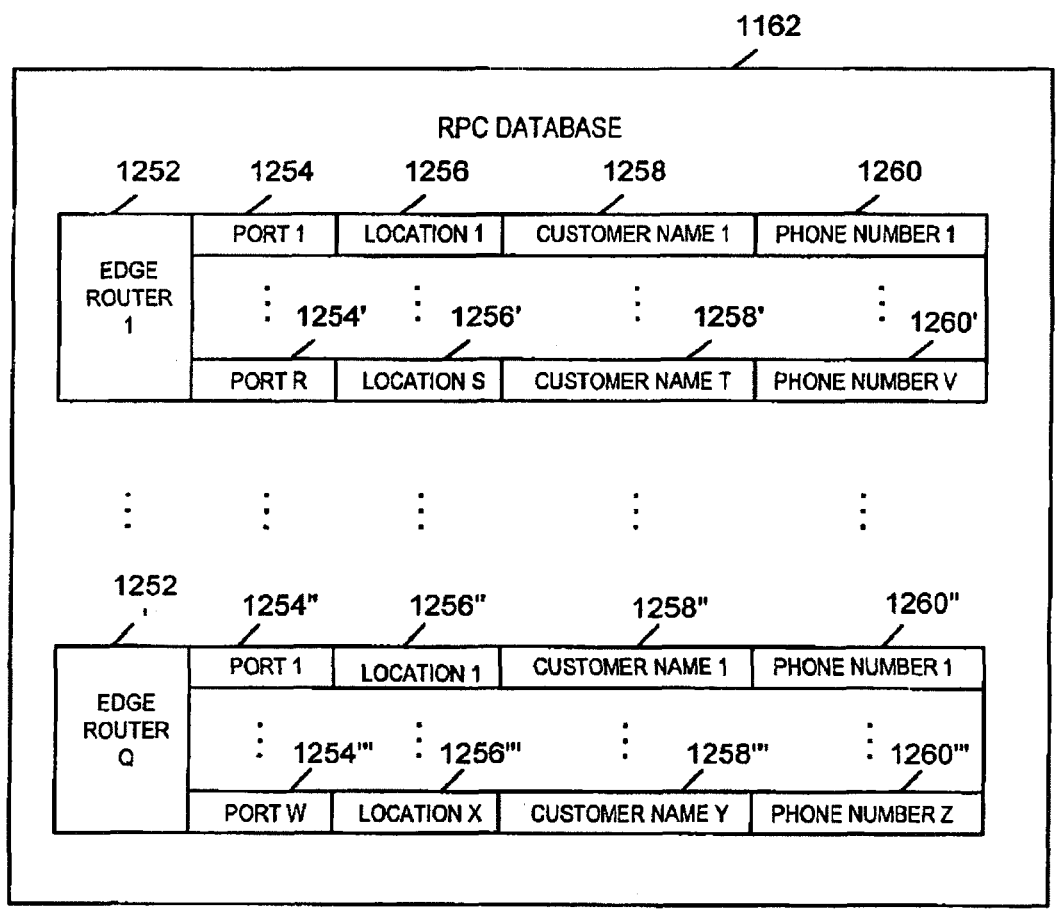
FIG. 12 illustrates a router and port number to customer (RPC) information database implemented in accordance with the invention.

FIG. 12 illustrates an exemplary RPLC database 1162. As illustrated the exemplary database includes Q records one record corresponding to each of Q edge routers. Each record includes a router identifier 1252, 1252' and a set of entries corresponding to particular router ports. Each router port entry includes a port identifier 1254, a location identifier 1256, customer name information 1258 and telephone number information 1260. The location information is the location of the customer premise, e.g., physical LAN location, from which the customer may access the IP network via the identified router and port. The phone number 1260 is the telephone number of a landline phone located at the corresponding physical location specified in the edger router/port entry. Additional customer information, e.g. billing, service subscription and level of desired privacy information, may also be included in the RPLC database 1162 for each router/port entry. The RPLC database 1162 is populated as subscribers contract with an IP service provider for IP service and is updated, e.g., periodically, to reflect changes in the customer information and/or the cancellation or modification of service.

The information request response routine (IRR) 1160 responds to requests for location and/or other customer information corresponding to an IP address. The IP address of interest and, optionally, the desired type of information, is included in an information request. Such information requests may come from a variety of sources, e.g., routers and/or servers implementing security routines, soft switch 536, etc.

Figure 13:
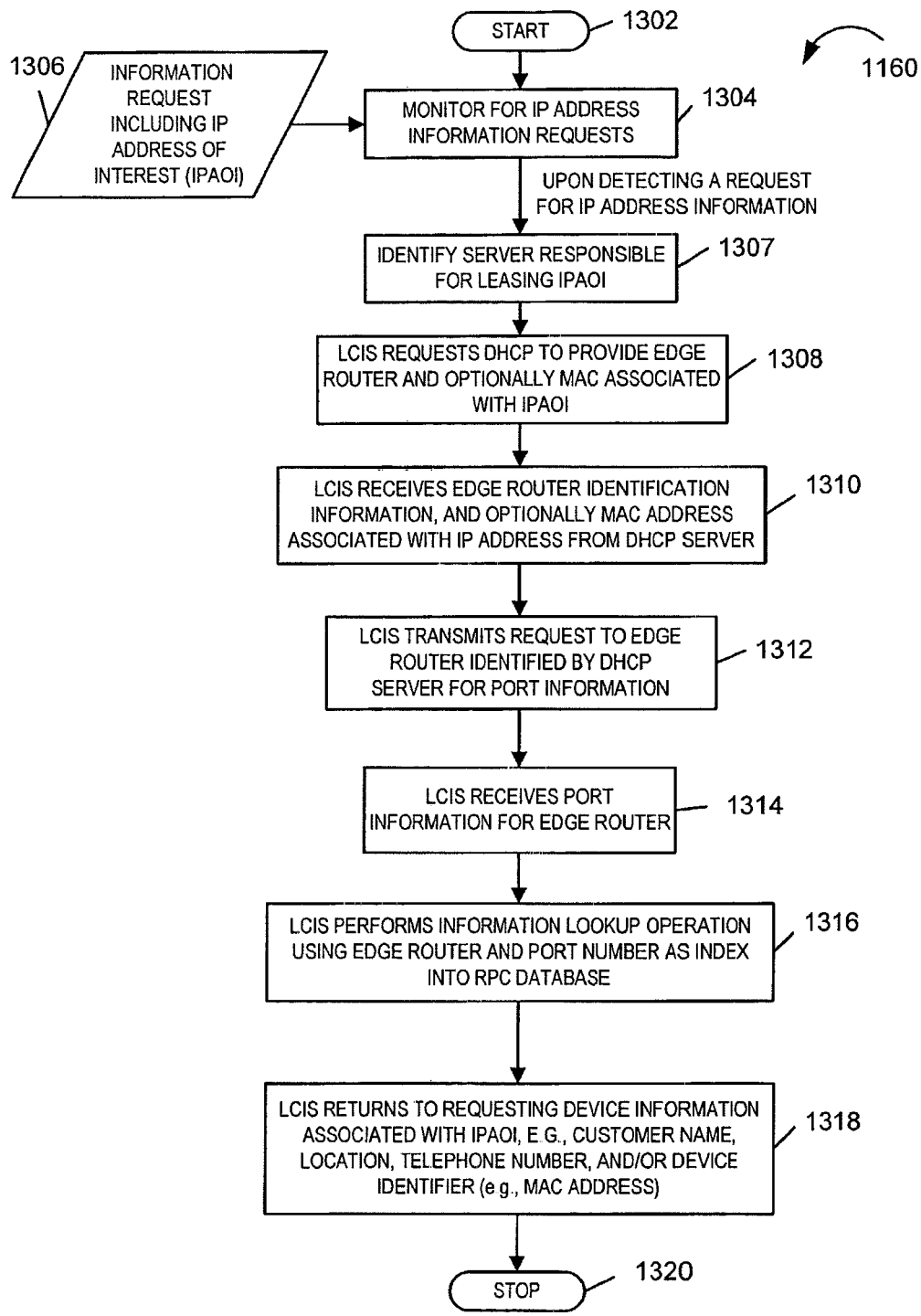
FIG. 13 illustrates a routine for providing customer information corresponding to an IP address in response to information requests.

An exemplary IRR routine 1160 will now be discussed with reference to FIG. 13. The IRR routine 1160 begins in step 1302 where it is executed by the CPU 1152, e.g., when the LCIS 534 is activated. Then in step 1304 the routine 1160 monitors for an information request 1306 including an IP address of interest (IPAOI). For each such detected IP address information request, operation proceeds to step 1307.

In step 1307 the LCIS 534 identifies, e.g., by querying its IP address to DHCP server database 1164, the DHCP server responsible for leasing the IPAOI to a device. Then, in step 1308, the LCIS 534 sends a message, including the IPAOI, to the identified DHCP server requesting information, e.g., edge router and MAC address information, corresponding to the IPAOI.

In step 1310, in response to the information request sent to the DHCP server, the LCIS 534 receives edge router identification information and, in some embodiments, the MAC address of the device to which the IPAOI was leased. Then in step 1312, the LCIS 534 transmits a request to the edge router identified by the DHCP server for port information relating to the IPAOI. The port number information request transmitted to the identified edge router includes, when available, the MAC address received from the DHCP server in addition to, or instead of, the IPAOI.

In response to the port information request message, in step 1314, the LCIS 534 receives from the contacted edge router, the edge router port number corresponding to the supplied IPAOI or MAC address. Then, in step 1316, the LCIS 534 accesses the RPLC database 1162 using the router and port number corresponding to the IPAOI to retrieve there from the requested location and/or customer information determined to correspond to the IPAOI.

Once the desired information, e.g., customer name, location, telephone number is retrieved from the RPLC database, in step 1318 it is returned to the device which requested information corresponding to the IPAOI. The MAC address may also be returned to the requesting device where device identification information is desired.

Once the requested information corresponding to the IPAOI has been transmitted to the requesting device, e.g., over the secure SMN 532, processing of the received IP address information request stops in step 1320. However, the monitoring operation of step 1304 and processing of other IP address requests will continue until the routine 1160 is terminated, e.g., by the LCIS 534 being turned off or shut down.

The soft switch 536 of the present invention supports many applications and allows calls to be routed between the IP and PSTN domains. When routing calls to emergency service centers as identified by, e.g., the called telephone number, e.g., 911, it is desirable that the soft switch 536 convey information to the service center that allows the emergency service center to determine the physical location from which an IP call was placed, e.g., so that emergency service personal can be dispatched to the location. As will be discussed below, the soft switch 536 achieves this by including a telephone number corresponding to the location from which an IP call was placed in the calling party information field of calls routed by the soft switch to an emergency call center. In cases of calls routed to other numbers in the PSTN domain, the soft switch inserts the telephone number of the IP telephony device from which a call was placed in the calling party information field of an SS7 call generated from the IP telephony call.

Figure 14:
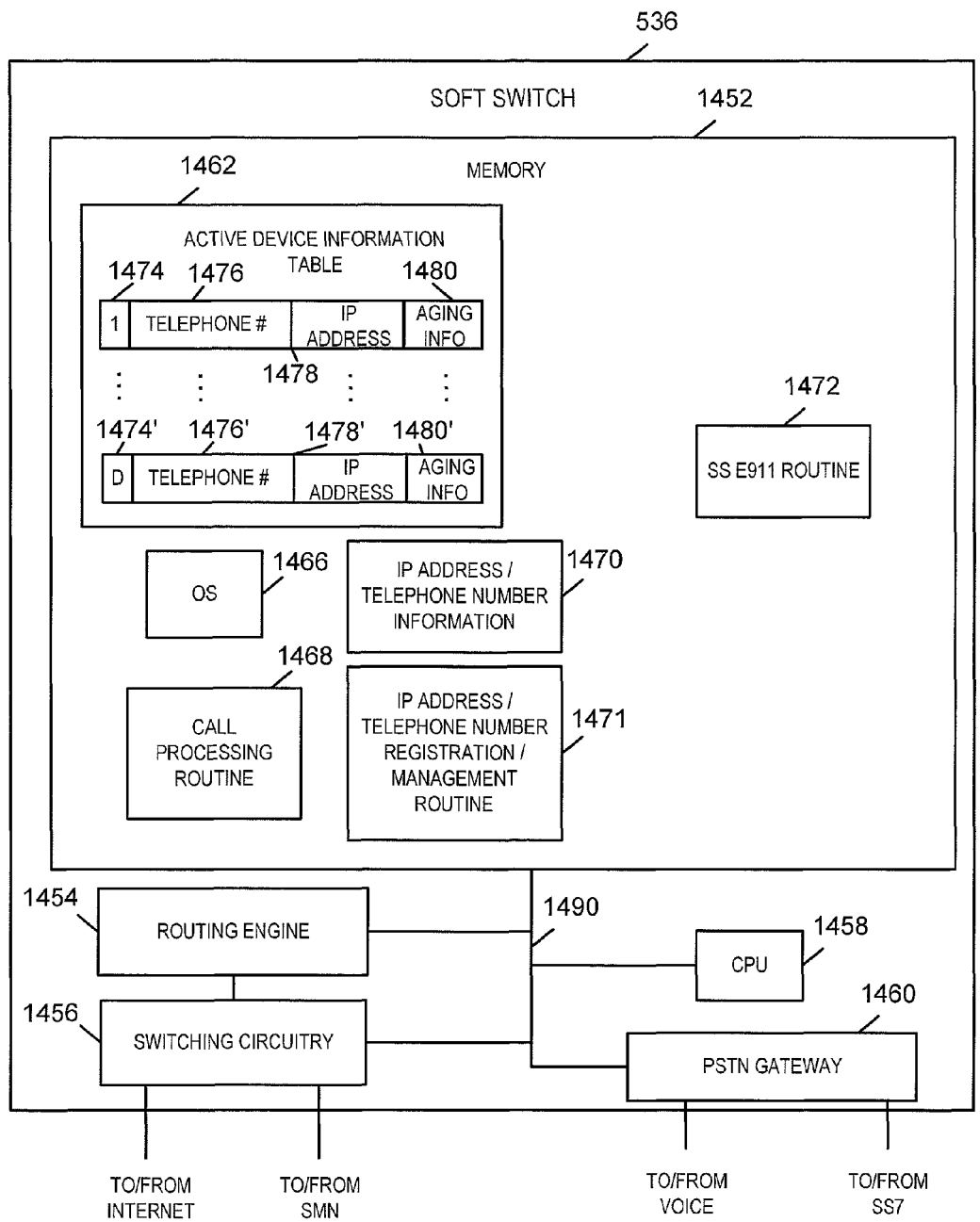
FIG. 14 illustrates a soft switch implemented in accordance with the present invention.

FIG. 14 illustrates an soft switch 536 implemented in accordance with the present invention which supports the emergency call feature of the present invention which allows a emergency call service center to determine the location of the IP caller from calling party telephone number information associated with a call.

As illustrated in FIG. 14, soft switch 536 includes CPU 1458, routing engine 1454, switching circuitry 1456, PSTN gateway 1460, and memory 1452, which are coupled together by bus 1490. In the FIG. 14 embodiment, the PSTN gateway 1460 is illustrated as part of the soft switch 536. However, it may be, and often is, implemented as a separate entity which is coupled to the soft switch 536. Accordingly, the FIG. 14 embodiment is intended to be exemplary but in no way limits or requires, for purposes of the invention, that the PSTN gateway 1460 be implemented as an element of the soft switch 536.

CPU 1458 controls soft switch operation under the direction of one or more routines stored in memory 1452. The various routines will be discussed further below. Routing engine 1454, using switching circuitry 1456 receives and transmits data from the IP base network 505, e.g., under control of CPU 1458. This data includes, for example voice data corresponding to IP telephone calls. The routing engine 1454 is coupled to the SMN 532 through the switching circuitry 1456 and can receive and send information and other signals over the SMN 532. The SMN 532 includes the LCIS database 534, which the soft switch 536 uses to obtain a telephone number corresponding to a location from which a call to an emergency service center was placed in accordance with one feature of the present invention. Address information corresponding to the physical location from which an IP telephony call was placed, e.g., to an emergency call service center may also be obtained from the LCIS database 534.

The soft switch's PSTN gateway 1460 serves as an interface between the IP domain and the SS7 domain which comprises the PSTN. The PSTN gateway 1460 converts the IP packets of an IP call directed to a destination in the PSTN to an SS7 signal format for transmission over the PSTN. This includes placing calling party information, e.g., a calling party telephone number, into one of the control fields associated with a SS7 call. Voice data is converted into voice signals which are transmitted in accordance with the SS7 standard as the voice portion of a call. The gateway 1460 also converts SS7 signals into IP packets for transmission to an IP telephony device. Thus, the gateway 1460 is responsible for converting between IP packet and SS7 signal formats for purposes of completing a call extends between the IP network and the PSTN. While shown as an element of the soft switch 536, the PSTN gateway 1460 can be implemented as a separate module from the soft switch. In one such embodiment multiple soft switches are coupled to the PSTN gateway. In this configuration, a plurality of soft switches can share the same PSTN gateway for purposes of transmitting calls to, and receiving calls from the PSTN 531.

The soft switch's memory 1452 includes operating system 1466, IP address/telephone number registration/management routine 1472, active device information 1462, call processing routine 1468, IP address/telephone number information 1470, and soft switch E911 routine 1472.

As discussed earlier, each device coupled to the Ethernet, e.g. device 1 208, obtains an IP address, when it needs to communicate over IP network 505 if it does not already have one assigned to it. If device 1 208 is an IP telephone, in addition to obtaining an IP address it also registers with the soft switch 536. IP address/telephone number registration/management routine 1471 is responsible for registering active IP telephony devices and storing the current IP address to be used when routing calls to/from the telephony device. It is also responsible for performing billing operations and for deleting entries from the active device information table 1462 when they log out or the IP address aging information indicates the stored IP address corresponding to a particular telephone number is no longer valid. As part of the registration process, the registering telephony device is authenticated to make sure it authorized to send/receiver calls corresponding to the telephone number the device provides.

After authentication, the registration/management routine 1471 stores the telephone number 1474 corresponding to a registering device along with the IP address 1476 assigned to the device and the corresponding IP address aging information 1480 in the active device information table 1462 maintained in memory. In FIG. 14, the table 1462 includes information corresponding to a D active devices with the information corresponding to each active telephony device being stored in a different row of the table 1462.

Using the active device information stored in table 1462 as a result of the registration process, the soft switch is able to route calls directed to the telephone number of an active IP telephony device by retrieving the corresponding IP address from table 1462 and routing the call over the IP network based on the retrieved IP address. Thus, the registration process and the resulting information stored in table 1462 allows device 1 208 to communicate with other telephones, and allows the IP service provider to keep track of the IP telephony users for billing and/or other purposes.

Call processing routine 1468 is used to process calls which are routed by the soft switch 536. Call processing routine 1468 uses IP/telephone number information 1470, active device information 1462 and, in the case of a call to an emergency call service center SS E911 routine 1472 to process a call. IP address/telephone number information 1470 includes information used to distinguish between telephone numbers corresponding to IP telephony devices and telephone numbers corresponding to the PSTN 531.

In one exemplary embodiment, when a user enters a telephone number on an IP phone, e.g., to place a call, the IP phone is connected to a local soft switch 536 for call routing purposes. Once a calling party is coupled to the soft switch 536, call processing routine 1468 becomes responsible for handling call routing.

Soft switch 536 uses IP address/telephone number information 1470 to determine if a dialed number is an IP telephone number or a PSTN telephone number. If the number is an IP number the call is routed using the routing engine 1454 and IP address information obtained from active device information table 1462 or a similar table maintained, e.g., by another soft switch 536. If the dialed number is to a PSTN telephone number the call is routed through the PSTN gateway 1460 with a telephone switch in the PSTN determining ultimate call routing for the PSTN portion of the call. Calls routed through the PSTN gateway from the PSTN are routed in the PSTN domain under direction of call processing routine 1468 in the same manner calls are routed from one IP telephony device to another. Thus, incoming telephone calls from both the IP-based telephone network and the PSTN are sorted, checked and subject to protocol/format conversion, if necessary, by the call processing routine 1468.

As part of normal call routing procedure, the call processing routine 1468 checks to determine if a call from an IP telephony device is directed to a telephone number corresponding to an emergency call center, e.g., a 911 call center, connected to the PSTN. When such calls are detected, e.g., based on the entered telephone number, e.g., 911, the call processing routine calls soft switch E911 routine 1472.

Thus, soft switch E911 routine 1472 is activated in response to the soft switch receiving a call to a telephone number it knows, e.g., based on stored information, corresponds to an emergency service center. A 911 call from an IP telephony device is an example of a call that triggers processing by the E911 routine 1472. This routine 1472 allows mobile IP telephone users to make emergency, e.g., 911, which will be supplied with a calling party ID, e.g., telephone number, corresponding to the location from which the call is placed before the call is routed to the emergency call service center via the PSTN 531. This allows an operator at the emergency call service center to obtain calling party location information based on the calling party number through a simple database look-up operation as done for normal landline calls. Thus, in accordance with the present invention calls to emergency call centers in the PSTN domain have the calling party number set to match the physical location from which the call was placed as opposed to the telephone number of the IP telephony device used to place the call. Soft switch E911 routine 1472 will be discussed in detail in regard to FIG. 16.

Figure 15:
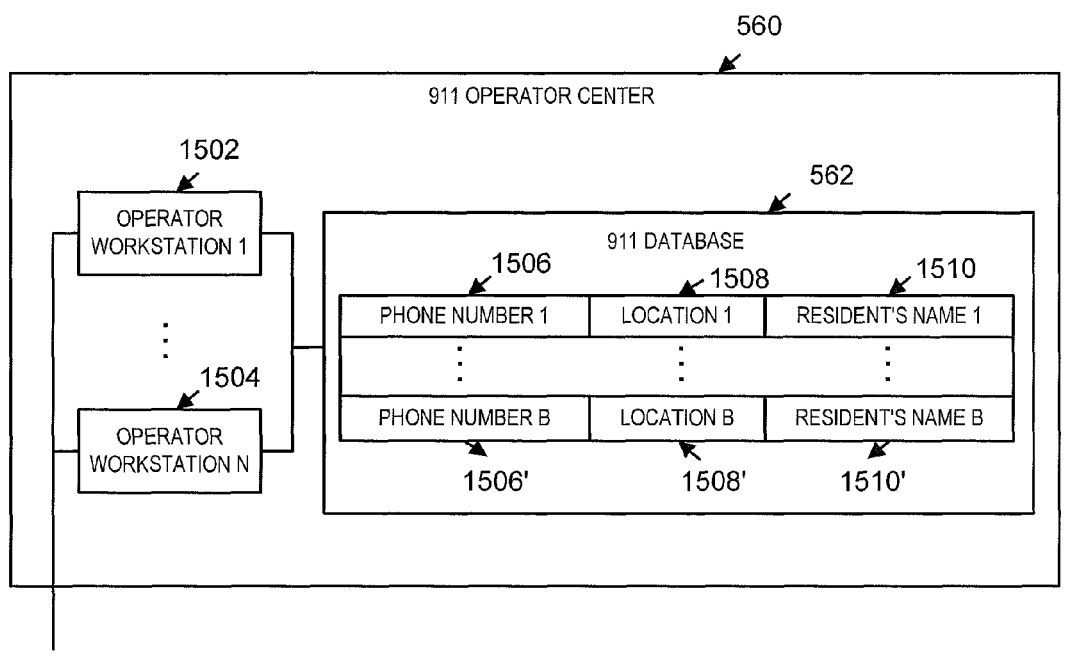
FIG. 15 illustrates a 911 operator center implemented in accordance with the present invention.

FIG. 15 illustrates an exemplary 911 emergency call service center, e.g., a 911 operator center 560. The service center 560 can be used in accordance with the present invention to provide emergency telephone service to IP and/or PSTN telephone users coupled to the center 560 via the PSTN 531. The center 560 includes a plurality of operator workstations 1 through N 1502, 1504, and a location information database, e.g., a 911 database 562. The 911 database 562 includes phone numbers 1506, 1506', and corresponding locations, e.g., addresses of service subscribes. In accordance with the present invention some phone numbers correspond to landline phones. In other cases the phone numbers correspond to numbers used to convey address information about customer premises from which an IP telephony device may operate. Such telephone numbers may be described as dummy or non-routing telephone numbers since they are not used for call routing purposes but to allow a 911 operator to retrieve location information corresponding to an IP service subscriber location in the event an emergency call is placed from the service subscriber's location, e.g., customer premises. Unique numbers, e.g., with a particular set of starting digits, may be used to distinguish non-routing numbers from landline telephone numbers thereby enabling an emergency service center operator to distinguish between a telephone number which can be used to contact a party and a telephone number which can be relied on for address retrieval purposes but not telephone contact purposes. In accordance with the invention, IP customer premise location information and an associated non-routing telephone number is added to the 911 database when the IP service subscriber 535 signs up for IP service assuming the database does not already include the telephone number of a landline phone located at the subscriber premises.

The telephone number of the IP telephony device may, and in one embodiment is, inserted by the soft switch into an SS7 signal field used to indicate a telephone from which a call is forwarded for IP telephony calls directed to an emergency call service center. In such an embodiment the service center is provided with the telephone number of the IP telephony device used to place the call in addition to the non-routing telephone number to be used for location determination purposes. Since, in some embodiments, the service center can determine from the format or value of the non-routing telephone number that it is a number which is not to be used for contact purposes, in such cases the operator can default to using the telephone number included in the call forwarding indicator field of the SS7 call to determine a telephone number which can be used to contact the calling party.

While shown as part of the service center 560, it is to be understood that the 911 database 562 may be located external to the center 560 and may be shared by multiple emergency call centers.

Working at an operator workstation 1502, an emergency call operator uses calling party telephone number information, also known as automatic number identification information, included in a received call to access the 911 database 562. Using the calling party telephone number, the operator retrieves the corresponding physical location information, e.g., address, which identifies the customer premises 531 from which an emergency call was placed to the center 560. The operator then uses, in many cases, the retrieved address information to dispatch an emergency aid worker, e.g., police and/or ambulance, to the identified location.

Figure 16:
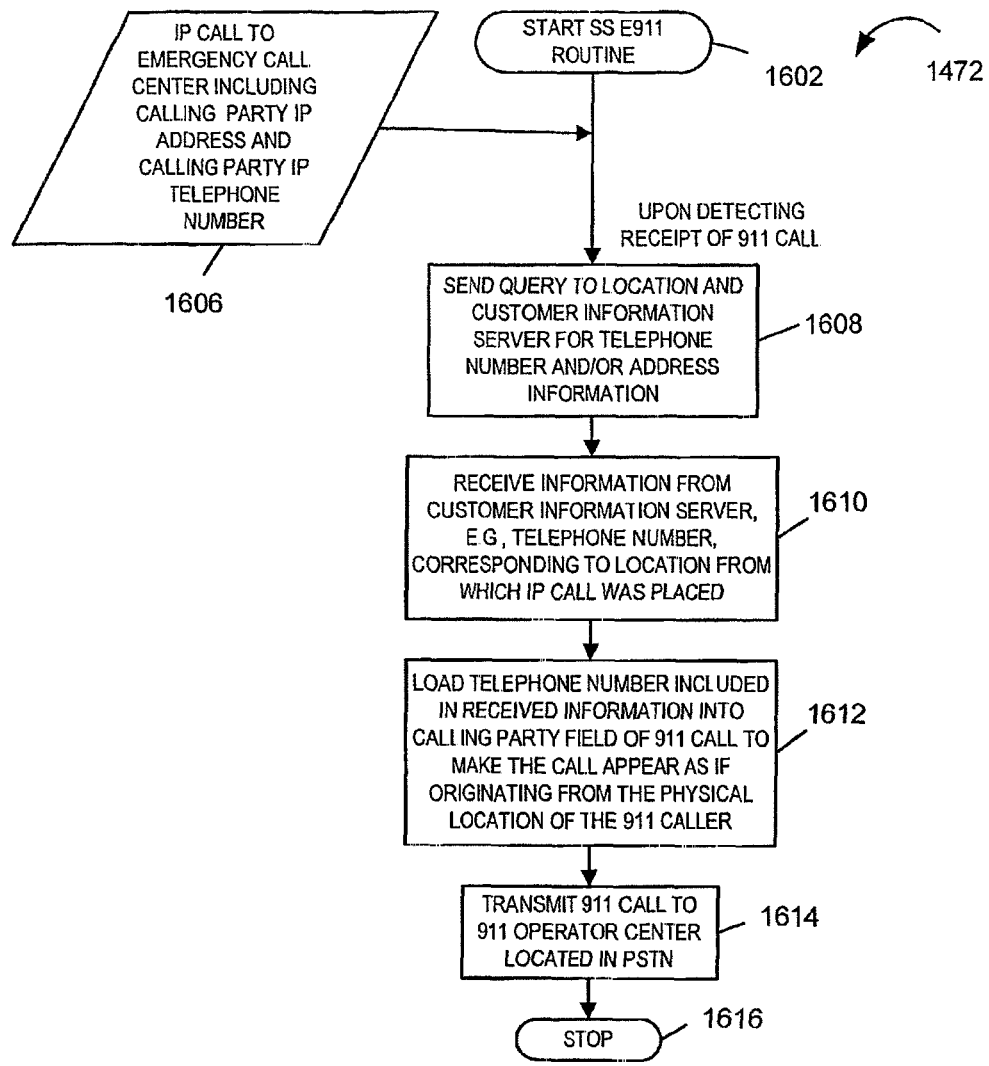
FIG. 16 illustrates an E911 routine implemented by a soft switch in accordance with the present invention.

The steps of an exemplary soft switch E911 routine 1472 implemented in accordance with the present invention will now be discussed with reference to the flow chart of FIG. 16. The soft switch E911 routine 1472 begins in step 1602 where it is executed by the CPU 1458, e.g., when a call to an emergency service center, e.g., a 911 call, is detected by call processing routine 1468. Next, in step 1608, the soft switch 536 queries a location and customer information server (LCIS) 534 for telephone number and/or address information correlating to the calling party's IP address and/or calling telephone number. The IP address and/or telephone number of the calling party, included in the query is used by the LCIS 534 to determine the physical location, e.g., customer premises, from which the call was placed. This information may be retrieved by the LCIS 534 using the techniques described above.

In step 1610, the soft switch 536 receives from the LCIS 534 the customer information, e.g., telephone number, corresponding to the customer premises from which the IP telephony call was placed. The received telephone number may be a landline telephone number or, in the case where a landline telephone in not present at the customer premises, a non-routing telephone number used for conveying location information.

In step 1612, the telephone number included in the received information is loaded into the calling party field of the 911 call. This makes the call appear as if it is originating from the physical location of the IP device. In step 1612, in some embodiments, the telephone number of the IP telephony device may be copied into a field normally used to convey a telephone number corresponding to a line through which a call was forwarded.

In step 1614, the soft switch 536 transmits the 911 call to the 911 operator center 560 located in the PSTN. The routine stops in step 1616.

When the 911 call is received at the 911 operator center 560, the call is routed to one of the operator workstations 1502, 1504. The 911 operator workstation will then use normal 911 routines to determine the physical location of the telephone number in the calling party of the 911 call. Since the IP telephone number was transmitted with the telephone number corresponding to the physical location of the IP telephone in the calling party field of the call, the operator workstation 1502 can locate the physical location of the IP telephone allowing emergency help to be dispatched to the correct location.

It is to be understood that numerous variations on the above described methods and apparatus are possible without departing from the scope of the invention.

What is claimed is:

1. A method of servicing an IP call from an IP telephony device, the method comprising the steps of:
    determining a telephone number associated with the physical location from which the IP call originated, wherein said determined telephone number is a telephone number that is not used for call routing purposes but is stored in a location information database in association with an address corresponding to the determined physical location;
    transmitting said call to a telephone call service center with call origination information including said determined telephone number, said call service center being an emergency call service center; and using the determined telephone number to retrieve, from a database including telephone numbers and associated location information, address information corresponding to the physical location from which the call was placed.

2. The method of claim 1, wherein transmitting said call to a telephone call service center includes:
converting said call from an IP packet format to an SS7 format; and
including in SS7 signaling information associated with the voice portion of the call, calling party identification information including said determined telephone number.

3. The method of claim 1, further comprising:
dispatching a rescue worker to an address included in the retrieved address information.

4. A communications system comprising:
an edge router including ports coupled to IP telephony devices;
a soft switch coupled to said edge router, the soft switch being for routing calls from said IP telephony devices;
a call service center for servicing telephone calls;
a location information database coupled to said call service center, the location information database including:
telephone numbers corresponding to landline telephones, a physical location being associated in said database with each landline telephone number; and
non-routing telephone numbers corresponding to locations of IP service subscribers, address information corresponding to a physical location being associated in said database with each non-routing telephone number; and
wherein said soft switch includes:
means for determining a telephone number associated with the physical location from which an IP call originated; and
means for transmitting IP calls to said call service center with call origination information including said determined telephone number.

5. The system of claim 4, wherein said non-routing telephone numbers are not used in said systems for call routing purposes.

6. The system of claim 4, further comprising:
a PSTN telephone switch coupled to said soft switch for processing telephone calls having an SS7 call format, calls in said SS7 format including voice and control signals.

7. The system of claim 6, wherein each of said non-routing telephone numbers has a format which is different from the format of said landline telephone numbers.

8. The system of claim 4, further including said IP telephony devices, at least some of said IP telephony devices being located at different physical locations.

9. A method of servicing an IP communication from an IP device, the method comprising the steps of:
determining a non-routing telephone number associated with the physical location from which the IP communication originated, wherein said determined non-routing telephone number is a telephone number that is not used for call routing purposes but is stored in a location information database in association with an address corresponding to the determined physical location;
transmitting said determined non-routing telephone number as part of a telephone call to a telephone call service center with said determined non-routing telephone number being provided to said service center as a call origination telephone number, said call service center being an emergency call service center; and
using the determined non-routing telephone number to retrieve, from a database including telephone numbers and associated location information, address information corresponding to the physical location from which the IP communication originated.

10. The method of claim 9, wherein transmitting said determined non-routing telephone number to a telephone call service center includes:
converting said IP communication from an IP format to an SS7 format; and
including in SS7 signaling information calling party identification information including said determined non-routing telephone number.

11. The method of claim 9, wherein said emergency call service center is a call service center which services 911 telephone calls.

12. A system for servicing an IP call from an IP telephony device, the system comprising:
a switching device configured to:
determine a telephone number associated with the physical location from which the IP call originated, wherein said determined telephone number is a telephone number that is not used for call routing purposes but is stored in a location information database in association with an address corresponding to the determined physical location; and
transmit said call to a telephone call service center with call origination information including said determined telephone number, said call service center being an emergency call service center; and
said call service center, said call service center being configured to use the determined telephone number to retrieve, from a database including telephone numbers and associated location information, address information corresponding to the physical location from which the call was placed.

13. The system of claim 12, wherein said switching device implements a soft switching operation.

* * * * *